US009120396B2

(12) United States Patent
Tabaczynski et al.

(10) Patent No.: US 9,120,396 B2
(45) Date of Patent: Sep. 1, 2015

(54) OCCUPANT CLASSIFICATION SYSTEM WITH SEAT BACK SENSOR

(71) Applicant: TK Holdings Inc., Auburn Hills, MI (US)

(72) Inventors: Michael Robert Tabaczynski, Northville, MI (US); Jeffrey Scott Bennett, Brownstown, MI (US); Phillip B. Maguire, Royal Oak, MI (US)

(73) Assignee: TK HOLDINGS INC., Auburn Hills, MI (US)

( * ) Notice: Subject to any disclaimer, the term of this patent is extended or adjusted under 35 U.S.C. 154(b) by 0 days.

(21) Appl. No.: 14/152,471

(22) Filed: Jan. 10, 2014

(65) Prior Publication Data

US 2014/0197942 A1    Jul. 17, 2014

Related U.S. Application Data

(60) Provisional application No. 61/751,750, filed on Jan. 11, 2013.

(51) Int. Cl.
| | | |
|---|---|---|
| *B60Q 1/00* | (2006.01) | |
| *B60N 2/00* | (2006.01) | |
| *B60R 21/015* | (2006.01) | |
| *B60N 2/56* | (2006.01) | |

(52) U.S. Cl.
CPC .............. *B60N 2/002* (2013.01); *B60N 2/5685* (2013.01); *B60R 21/0154* (2014.10); *B60R 21/01532* (2014.10)

(58) Field of Classification Search
CPC ................ B60N 2/002; B60N 2/5685; B60R 21/01532; B60R 21/0154; B60R 21/01526; B60R 21/01516

USPC ................... 340/457.1, 667, 438, 425.5, 457; 280/732, 734, 735, 801.1; 180/270
See application file for complete search history.

(56) References Cited

U.S. PATENT DOCUMENTS

| | | | |
|---|---|---|---|
| 5,129,704 A | | 7/1992 | Kishi et al. |
| 5,683,103 A | | 11/1997 | Blackburn et al. |
| 2004/0075259 A1 | | 4/2004 | Baba et al. |
| 2006/0187038 A1* | | 8/2006 | Shieh et al. .................... 340/562 |
| 2007/0192007 A1* | | 8/2007 | Stanley et al. .................. 701/45 |
| 2007/0205884 A1 | | 9/2007 | Federspiel et al. |
| 2008/0021650 A1* | | 1/2008 | Launay et al. .................... 702/1 |
| 2008/0186282 A1 | | 8/2008 | Nix et al. |
| 2011/0029203 A1* | | 2/2011 | Watson et al. ................... 701/45 |
| 2011/0074567 A1* | | 3/2011 | Miyamori et al. .......... 340/457.1 |
| 2012/0161953 A1* | | 6/2012 | Nakagawa .................... 340/438 |

OTHER PUBLICATIONS

International Search Report and Written Opinion dated Jun. 18, 2014 issued in PCT/US2014/011002.

* cited by examiner

*Primary Examiner* — Anh V La
(74) *Attorney, Agent, or Firm* — Foley & Lardner LLP

(57) ABSTRACT

A classification system for determining the occupancy state of a seat of a vehicle. The classification system includes a first sensing electrode located in a back portion of the seat and a second sensing electrode located in a base portion of the seat. The system includes a measurement circuit configured to measure a first property associated with the first sensing electrode and a second property associated with the second electrode. A controller is configured to send an occupancy signal indicative of the occupancy state of the seat based on the measured properties associated with the first and second sensing electrodes. The controller may be configured to send the occupancy signal to a Seat Belt Reminder (SBR) system.

20 Claims, 3 Drawing Sheets

| seat bottom sensor | seat back sensor | | SBR |
|---|---|---|---|
| ON | ON | | ON |
| | OFF | | |
| OFF | ON | OFF | OFF |

FIG. 3

OCCUPANT CLASSIFICATION SYSTEM WITH SEAT BACK SENSOR

CROSS REFERENCE TO RELATED APPLICATIONS

This application claims priority to and the benefit of U.S. Provisional Patent Application No. 61/751,750, filed on Jan. 11, 2013. The foregoing provisional application is incorporated by reference herein in its entirety.

BACKGROUND

The present invention relates generally to the field of occupant classification systems. More specifically, the present invention relates to a capacitive or electric field based occupant classification systems for automobile seats.

Some current seat occupant classification systems generally differentiate between adults and conductive objects using a weight or pressure measurement for an object presence measurement (OPM). For example, a fluid filled bladder may be provided within the seat cushion. The downward force of a seat occupant or object pressurizes the fluid. The pressure in the fluid is measured with the assumption that an object weighs less than an adult occupant of the seat.

It would be advantageous to eliminate the need for a pressure or weight based measurements to discriminate conductive objects on the seat from occupants and the costs that are associated with those measurements.

BRIEF DESCRIPTION OF THE DRAWINGS

Features, aspects, and advantages of the present invention will become apparent from the following description, and the accompanying exemplary embodiments shown in the drawings, which are briefly described below.

FIG. 3 is a table showing an exemplary logic for instructions sent to a seat belt reminder system by a seat occupation classification system having both a seat bottom sensor and a seat back sensor.

DETAILED DESCRIPTION

It is to be understood that both the foregoing general description and the following detailed description are exemplary and explanatory only.

Figure 1:
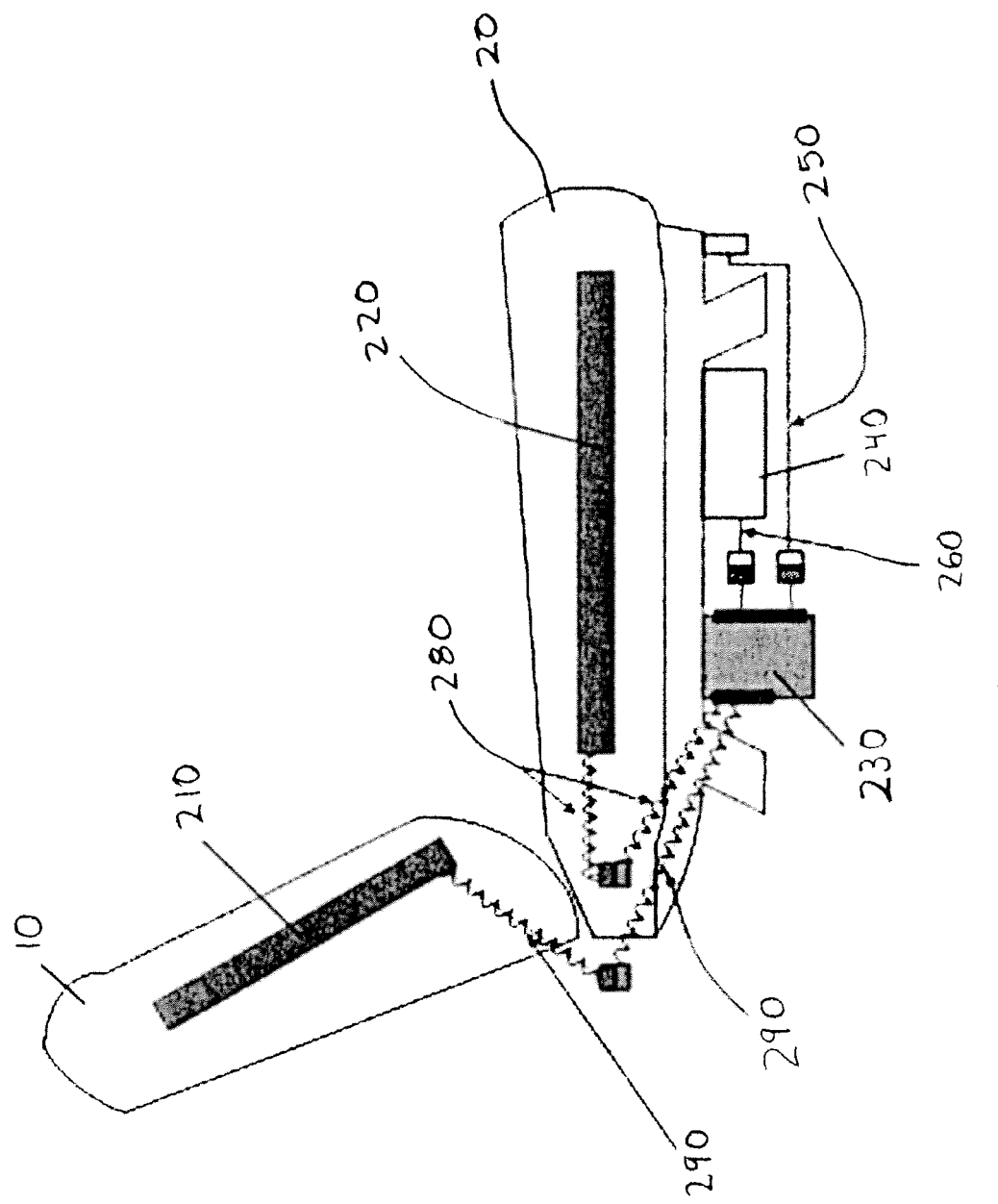
FIG. 1 is a schematic cross section view of a seat including a seat occupant classification system.
Figure 2:
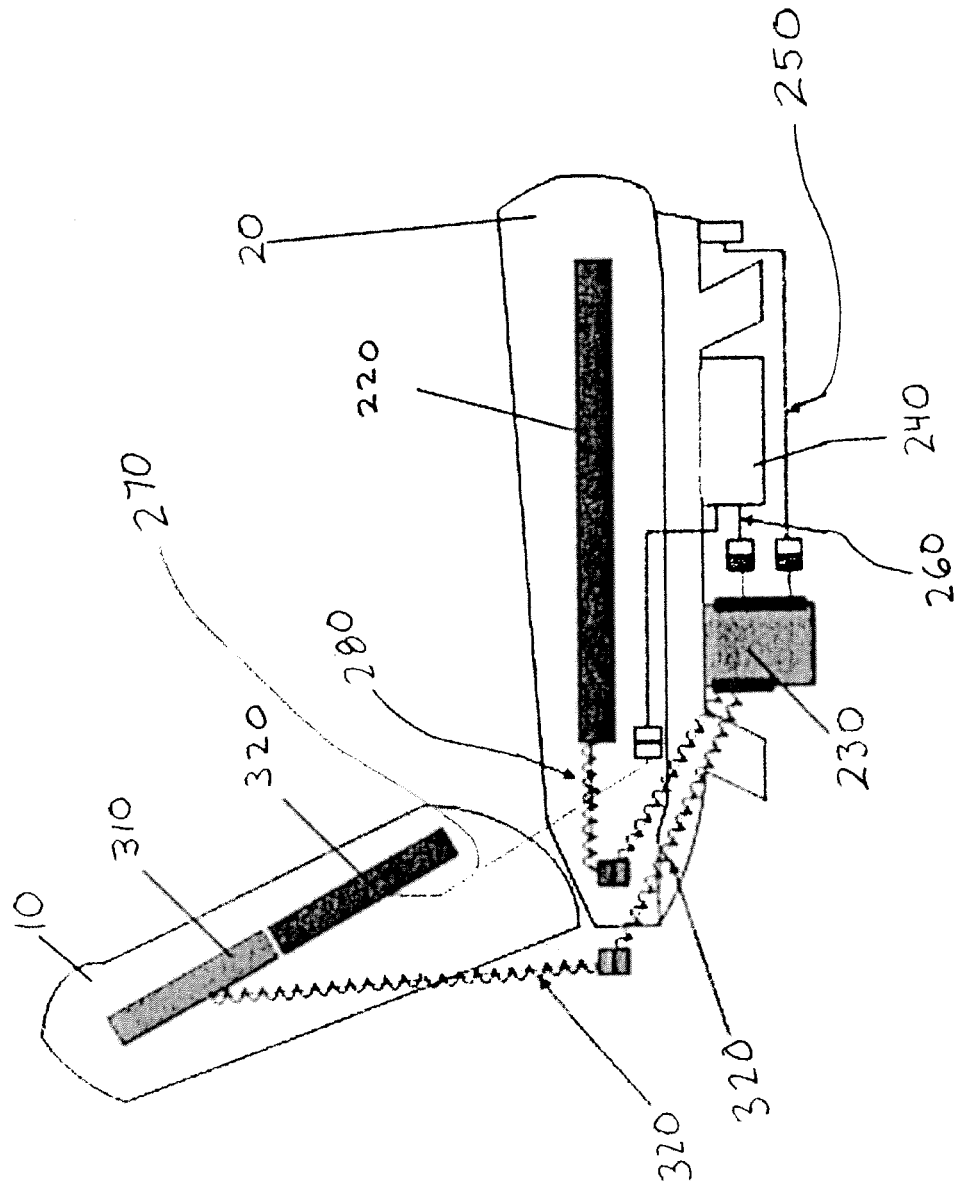
FIG. 2 is a schematic cross section view of a seat including a seat occupant classification system include a pair of separate conducting electrodes positioned in the seat back.

Referring in general to FIGS. 1-3, an occupant classification (OC) system includes a conductor or electrode 210 serving as an electric field sensor in the seat back. In addition, a conductor or electrode 220 capable of producing an electrode field may be located in the bottom of the seat. The seat back sensor 210 is monitored separately from a sensor in the seat bottom to discriminate conductive objects on the seat from occupants. Because the measurement detected by monitoring a signal from the seat back sensor 210 is different for an object in the seat than the measurement from a signal from the seat back sensor 201 for an occupant in the seat, the OC system can utilize the seat back sensor 210 to differentiate between an object and an occupant, both of which may otherwise trigger a system that only includes a sensor provided in the seat bottom.

An OC system for a vehicle seat having a seat bottom and a seat back is shown in FIGS. 1 and 2. The OC system includes a first electrode 220 in the seat base or bottom 20. The electrode or conductor 220 may be used as a sensing electrode for capacitive or electric field based sensing. The seat bottom sensor 220 may be integrated into another system. The system may also include a conductor or electrode 210 located in the seat back 10. As shown in FIGS. 1 and 2, the conductors or electrodes 210, 220 located in the seat bottom 20 and seat back 10 may be used as heating devices. The seat may include a heater controller 240 to regulate the heaters 210, 220 in the seat bottom 20 and/or the seat back 10 and an electronic control unit (ECU) 230 coupled to the sensors 210, 220 in the seat bottom 20 and/or seat back 10 to detect and categorize an object or occupant in the seat. The ECU may include sensing and measurement circuits.

If the sensor is integrated into the heater system, the heater controller 240 and the ECU 230 may be connected in series such that power and/or control signals may be provided to the conductor (i.e., sensing and heater device) by, for example, the heater controller 240 through the ECU 230. While the heater controller 240 and the ECU 230 are shown schematically in FIGS. 1 and 2 as being provided under the seat bottom 20, in various embodiments the heater controller 240 and/or the ECU 230 may be provided elsewhere in the vehicle, such as in the vehicle dash, in a center console, etc. In other exemplary embodiments, the seat may not be a heated seat and may lack components such as heater devices and a heater controller.

The OC system may employ a capacitive sensing system sends a time varying voltage out to a single sensing element or sensor. The sensor may for example, be one or both of the electrodes shown in FIG. 1. The system measures a property such as the loading current (or impedance) to ground from the sensing element by monitoring the voltage signal provided to the sensing conductor or element. This measurement may utilize a signal or property of measure that is representative of the desired property to be measured (i.e., impedance or current). For this measurement, a human occupant has a low impedance to ground while an empty seat or a seat with an object resting upon it (e.g. a purse, backpack, briefcase, groceries, child safety seat, etc.) has a high impedance to ground. The OC system may utilize this measurement to provide input to other vehicle systems, such as an airbag system or a seat belt reminder (SBR) system. For example, if the OC system detects a low impedance from the seat bottom sensor indicating an adult occupant, it may instruct the airbag system to activate one or more airbags associated with the seat in a collision. If, however, the OC system detects a high impedance from the seat bottom sensor, it may instruct the airbag system to deactivate one or more airbags associated with the seat in a collision, as the high impedance measurement may be interpreted as an empty seat or a seat containing an object such as child safety seat.

The time varying voltage applied to the sensor could take many shapes, although a preferred shape is a sinusoidal signal at frequencies between about 50 kHz and about 150 kHz. This loading current increases significantly when an adult occupant is on the seat and only slightly when there is a child seat on the vehicle seat.

The sensing system may utilize a measurement system that measures the in-phase (I) and quadrature (Q) components of the current supplied to the sensing electrode via voltage signal. With such a measurement system, separation remains between the adult and the RFIS/wet seat situation. Thus, the sensor system can distinguish between an adult and a RFIS (Rear Facing Infant Seat) on the seat in both normal and wet seat situations. Using the I and Q measurements, seal the sensing electrodes from direct contact with the wet seat foam of the vehicle seat, and ensure that the seat structure is grounded to allow separation between the RFIS/wet seat and normally seated adult cases.

The sensing system can use both the I and Q measurements measured by a current measurement circuit, which sends the I and Q measurements to a microprocessor to make a classification of the occupant during wet seat situations because the nature of the impedance to ground changes when the seat is wet. Without using both I and Q, there would be overlap between the RFIS (infant cases) and small adults (the "standard small adult" are referred to as "5th %" cases, which are occupants approximately 108 lbs.). Both the I and Q measurements are used in order to recognize separation between the RFIS cases and the small adult cases.

As an alternative, I and Q measurements need not be made. Instead, for example, the phase and amplitude of the current sent to the sensing electrode could be measured to gain equivalent information. According to an embodiment, the impedance from the sensing electrode to ground should be characterized such that capacitive components of the impedance affect the measurement differently than the resistive components of the impedance. Once the I and Q measurements/values (or other appropriate measurements) are obtained, a corresponding measured signal is provided to a controller or microprocessor preferably located in the ECU of the occupant classification system. The controller may be configured to make an occupant classification determination (see, e.g., FIG. 3).

Also, for the voltage signal to the sensing electrode, time varying shapes may be used that are not sinusoidal signals. If this is the case, alternative methods of identifying the characteristics of the impedance could be used. For example, square pulses could be sent out to the sensing electrode. The current sent out to the sensing electrode could be measured and characteristics such as the peak and rise time of the current pulse could be used to characterize the sensing electrode's impedance to ground. Alternatively, several pulses of different length could be sent out to the sensing electrode. Characteristics of the impedance could be derived by analyzing the relationship between the peak currents and the variation of the current with pulse length. In general, the principles of operation of the capacitive (i.e., electric field) sensor described herein can be the same as described in U.S. Patent Publication No. 2007/0192007, the entirety of which is incorporated by reference herein.

The seat bottom sensor, however, may detect a false positive if the object on the seat is a grounded conductive object that may have a low impedance to ground and cannot be discriminated from an adult occupant of the seat (e.g., a laptop computer, a portable DVD player, etc.) This may cause unintended actions by other vehicle systems, such as causing the SBR system to sound a buzzer or provide another signal when a conductive object is placed on the seat.

The OC system therefore further includes a second sensor (i.e., seat back conductor or sensor 210) for the vehicle seat provided in the seat back 10 and coupled to the ECU 230. According to an exemplary embodiment, the seat back sensor 210 is a capacitive or electric field based sensor that is sensed independently from the seat bottom sensor. As shown in FIG. 1, in one embodiment, the seat back sensor 210 may also serve as a heater element provided in a heated seat back. As shown in FIG. 2, the seat back sensor 310 may be provided separately from a heater element 320 in the seat back.

As shown in the drawings, the heating elements and sensing electrodes are connected to the ECU 230 via wiring harnesses 320, 290, 280. The heater controller 240 is connected to the ECU by a signal carrying conductor 260. When a separate heating element 320 is provided, the heater controller 240 may interface directly with the heating element 320 via signal carrying conductor 270, without coordinating with the system ECU 230. The system ECU 230 is connected to a power supply and the vehicle LAN via signal carrying conductor 250. Thus, the ECU 230 may provide outgoing signals to various vehicle systems, e.g., vehicle safety systems such as, for example, airbag systems.

The sensing and heating electrodes may be contained in a sensing mat. The sensing and heating elements may be integrated into a signal conductor or separately provided in the matt. The sensing element and heating element can be made of conventional wire or other conductive materials suitable for vehicle seat applications. As described above, the sensing element is configured to obtain capacitive measurements from an occupant sitting in a vehicle seat that are indicative of what type of occupant is in the seat. The heating element is configured to heat the vehicle seat and thereby providing warmth to an occupant.

The sensing element and heating element may be sewn into a sensing mat. Also, in addition to the sensing element and/or a heating element, a thermistor may be mounted on the sensing mat for measuring the temperature of the heating element. If provided separately, such as shown in FIG. 2, the sensing element 310 and heating element 320 may be positioned a predetermined distance apart in the sensing mat.

The distance between the sensing element 310 and the heating element 320 is sufficient so that the heating signal generated by the heating element 320 has limited impact on the sensing signal generated by the sensing element 310. For example, The arrangement and operation disclosed in U.S. Patent Application Publication No. 2007/0192007 (incorporated by reference herein) may be employed.

In general, the seat back sensor 210, 310 senses a different impedance for a conductive object placed on the seat in comparison to an adult occupant of the seat even if the two have a similar impedance as measured by the seat bottom sensor 220. The seat back sensor 210, 310 therefore allows for a more precise determination of the nature of the object or occupant in the seat compared to a OC system utilizing only a sensor in the seat bottom. More accurate instructions may therefore be communicated to other vehicle systems, such as the airbag system or the SBR system. For example, utilizing measurements collected by the seat back sensor, the OC system may allow the SBR system to be disabled for a vehicle seat when the seat back sensor measures a low impedance (e.g., an off signal) even if the seat bottom sensor measures a large impedance (e.g., an on signal).

One example of a logic table for determining instructions sent to an SBR system by a OC system having both a seat bottom sensor and a seat back sensor is shown in FIG. 3. The OC system controller, mentioned above, may employ the logic shown in FIG. 3 to determine the classification of the occupant or make a determination whether an occupant is present. The controller may provide an appropriate signal to other vehicle systems such as the SBR system. The controller and ECU may communicate with these other vehicle systems via the vehicle local area network (LAN). The ECU may be connected to the LAN via conductive line 250. In FIG. 3, the designation of vehicle sensor "ON" may correspond to a measurement signal indicating the presence of an occupant in the seat. Thus, the SBR system should only be activated when both the seat bottom sensor and seat back sensor provide signals indicating the present of an occupant.

In another exemplary embodiment, the OC system may utilize a force sensitive resistor (FSR) in the seat bottom in addition to or instead of an electric field sensor in the seat back. The FSR may be integrated into the seat bottom sensor or may be provided separately from the seat bottom sensor (e.g., coupled to the top or bottom surface of the sensor). The resistance of the FSR varies in relation to the downward force being applied to the seat bottom. A resistance caused by a threshold force being applied to the seat bottom may be determined and the resistance of the FSR may therefore be used to determine if the seat is occupied by an adult applying a relatively high force to the FSR or by an object with a low impedance to ground but applying a relatively low force to the FSR.

The addition of the seat back sensor provides additional data that could be used for occupant classification by the OC system. For example, the data provided by the seat back sensor may be utilized by the OC system to differentiate between a 5 percentile female occupant and 95 percentile male occupant. The additional data provided to the OC system may then allow for a more effective utilization of other vehicle systems, such as an airbag system.

It is important to note that the construction and arrangement of the occupant classification system as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A classification system, for determining the occupancy state of a seat of a vehicle, the system comprising:
   a first sensing electrode located in a back portion of the seat;
   a second sensing electrode located in a base portion of the seat;
   a measurement circuit configured to measure a first property associated with the first sensing electrode and a second property associated with the second electrode; and
   a controller configured to send an occupancy signal indicative of the occupancy state of the seat based on the measured properties associated with the first and second sensing electrodes;
   wherein when the second property associated with the second electrode in the base portion of the seat is indicative of no occupant being located on the base portion of the seat, then the occupancy signal indicates no occupant is located on the seat regardless of the first property associated with the first electrode in the back portion of the seat.

2. The system of claim 1, wherein the controller is configured to send the occupancy signal to a Seat Belt Reminder (SBR) system, and wherein when the second property associated with the second electrode in the base portion of the seat is indicative of no occupant being located on the seat, the SBR system is OFF regardless of the first property associated with the first electrode in the back portion of the seat.

3. The system of claim 1, wherein the controller and the measurement circuit are located in the same electronic control unit.

4. The system of claim 1, wherein the measurement circuit provides a first measured signal to the controller and wherein the first measured signal is indicative of the first property.

5. The system of claim 4, wherein the measurement circuit provides a second measured signal to the controller and wherein the second measured signal is indicative of the second property.

6. The system of claim 5, wherein the controller is configured to make a determination of the occupancy state of the seat based on the first and second measured signals.

7. The system of claim 6, wherein the controller is configured to determine that the seat is occupied if both the first measured signal and the second measured signal indicate that the seat is occupied, and wherein the SBR system is ON.

8. The system of claim 7, wherein the controller is configured to determine that the seat is not occupied if the second measured signal indicates that the seat is not occupied, and wherein the SBR system is OFF.

9. The system of claim 8, wherein the controller is configured to determine that the seat is not occupied if the first measured signal indicates the seat is not occupied and the second measured signal indicates that the seat is occupied, and wherein the SBR system is OFF.

10. The system of claim 9, wherein the determination of the controller is provided to the Seat Belt Reminder (SBR) system in the form of the occupancy signal.

11. The system of claim 1, wherein the measurement circuit is configured to measure in-phase and quadrature components of a first current carried by the first sensing electrode and to measure in-phase and quadrature components of a second current carried by the second sensing electrode.

12. The system of claim 1, further comprising a heating element located in the seat bottom.

13. The system of claim 12, wherein the heating element is integrated into a second conductor.

14. A classification system, for determining the occupancy state of a seat of a vehicle, the system comprising:
   a first electrode located in a back portion of the seat;
   a second electrode located in a base portion of the seat;
   a control unit configured to send a voltage signal to each of the first and second electrodes;
   a measurement circuit configured to measure a property of the voltage signals provided to the first and second electrodes; and
   a controller configured to send an occupancy signal indicative of the occupancy state of the seat based on a detected change in the voltage signals, wherein the controller is configured to determine that the seat is occupied if both the measured property of the voltage signal to the first electrode and the measured property of the voltage signal to the second electrode indicate that the seat is occupied;
   wherein the controller is configured to send the occupancy signal to a Seat Belt Reminder (SBR) system, and wherein the SBR system is ON only when both the measured property of the voltage signal to the first electrode and the measured property of the voltage signal to the second electrode separately indicate that the seat is occupied.

15. The system of claim 14, wherein the second electrode is configured to function as a heating element.

16. The system of claim 14, wherein the control unit comprises the measurement circuit and the controller.

17. The system of claim 14, further comprising a separate heating element located in the seat back.

18. A method of determining the occupancy state of a vehicle seat including a seat bottom and a seat back for a classification system, the method comprising the steps of:
   measuring a first property associated with a first sensing electrode located in the seat back of the vehicle seat;
   measuring a second property associated with a second sensing electrode located in the seat bottom of the vehicle seat;
   comparing the first property associated with the first sensing electrode with the second property associated with the second sensing electrode in a controller to determine the occupancy state of the vehicle seat; and
   communicating an occupancy signal to a Seat Belt Reminder (SBR) system based on the determined occupancy state of the vehicle seat,
   wherein the SBR system is OFF when the first property associated with the first sensing electrode located in the seat back indicates that no occupant is located on the seat and when the second property associated with the second sensing electrode located in the seat bottom indicates that an occupant is located on the seat.

19. The method of claim 18, wherein the SBR system is ON when the first property associated with the first sensing electrode located in the seat back indicates that an occupant is located on the seat and when the second property associated with the second sensing electrode located in the seat bottom indicates that an occupant is located on the seat.

20. The system of claim 19, wherein the SBR system is OFF when the first property associated with the first sensing electrode located in the seat back indicates that an occupant is located on the seat and when the second property associated with the second sensing electrode located in the seat bottom indicates that no occupant is located on the seat.

* * * * *